(12) United States Patent
Moosburger et al.

(10) Patent No.: US 9,596,165 B2
(45) Date of Patent: Mar. 14, 2017

(54) MULTIDIMENSIONAL REPRESENTATION OF SIGNALLING PROTOCOL LOG FILES

(71) Applicant: ROHDE & SCHWARZ GMBH & CO. KG, München (DE)

(72) Inventors: Thomas Moosburger, Munich (DE); Guido Lauerburg, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 150 days.

(21) Appl. No.: 14/401,304

(22) PCT Filed: Jun. 12, 2013

(86) PCT No.: PCT/EP2013/062178
§ 371 (c)(1),
(2) Date: Nov. 14, 2014

(87) PCT Pub. No.: WO2014/009091
PCT Pub. Date: Jan. 16, 2014

(65) Prior Publication Data
US 2015/0135017 A1    May 14, 2015

(30) Foreign Application Priority Data

Jul. 9, 2012   (DE) .................. 10 2012 211 918
Aug. 10, 2012  (DE) .................. 10 2012 214 287

(51) Int. Cl.
G06F 11/00   (2006.01)
H04L 12/26   (2006.01)
H04L 12/24   (2006.01)

(52) U.S. Cl.
CPC .............. H04L 43/18 (2013.01); H04L 41/22 (2013.01); H04L 43/045 (2013.01); H04L 43/50 (2013.01)

(58) Field of Classification Search
CPC ....... H04L 43/18; H04L 41/22; H04L 43/045; H04L 43/50
(Continued)

(56) References Cited

U.S. PATENT DOCUMENTS 7,607,093 B2   10/2009  Blomquist
2005/0243728 A1  11/2005  Vehse et al.
(Continued)

FOREIGN PATENT DOCUMENTS

DE   10313589 A1   8/2004
EP   2117133 A1   11/2009
GB   2428354 A    1/2007

OTHER PUBLICATIONS

Wikipedia "screen shot" page from date Jul. 4, 2012, retrieved using the WayBackMachine from https://web.archive.org/web/20120704053836/https://en.wikipedia.org/wiki/Screenshot.*
(Continued)

Primary Examiner — Yair Leibovich
(74) Attorney, Agent, or Firm — Ditthavong & Steiner, P.C.

(57) ABSTRACT

A testing device comprises a storage unit (17), a display unit (11) and a control unit (12). The storage unit (17) is embodied to store messages of at least one test performed on at least one device under test. The control unit (12) is embodied to read in and display on the display unit (11) at least a part of the messages. The control unit (12) provides a view-generating device (14), which is embodied simultaneously to generate and display by means of the display unit (11) at least two views in each case with at least a part of the messages to be displayed. In this context, the views are displayed in a synchronized manner.

16 Claims, 7 Drawing Sheets

(58) Field of Classification Search
USPC .......................................................... 714/46
See application file for complete search history.

(56) References Cited

U.S. PATENT DOCUMENTS

2010/0093283 A1* 4/2010 Negami ................. H04B 17/23
　　　　　　　　　　　　　　　　　　　　　　　　 455/67.7
2015/0135017 A1* 5/2015 Moosburger ............ H04L 43/18
　　　　　　　　　　　　　　　　　　　　　　　　 714/37

OTHER PUBLICATIONS

Notification of Transmittal of Translation of the International Preliminary Report on Patentability; International Preliminary Report on Patentability; Written Opinion of the International Searching Authority for corresponding International Application No. PCT/EP2013/062178, dated Jan. 22, 2015, 9 pages.
Agilent, "Agilent E2960B Series for PCI Express 2.0", Data Sheet Version 2.4, Nov. 3, 2011, pp. 1-36—company publication.
Tektronix, "Tektronix PCI Express Logic Protocol Analyzer", TLA7SA00 Series Datasheet, Dec. 28, 2011, pp. 1-8—company publication.
International Search Report for corresponding International Application No. PCT/EP2013/062178, dated Sep. 20, 2013, 2 pages.

\* cited by examiner

MULTIDIMENSIONAL REPRESENTATION OF SIGNALLING PROTOCOL LOG FILES

CROSS-REFERENCE TO RELATED APPLICATION

The present application is a national phase application of PCT Application No. PCT/EP2013/062178, filed Jun. 12, 2013, and claims priority to German Application No. DE 10 2012 211 918.3, filed on Jul. 9, 2012, and to German Application No. DE 10 2012 214 287.8, filed on Aug. 10, 2012 the entire contents of which are herein incorporated by reference.

BACKGROUND OF THE INVENTION

Field of the Invention

The invention, according to the various embodiments described herein, relates to a testing device and a method which allow a parallel display of different views of one or more log files which represent a recorded test run.

Discussion of the Background

A central problem in the analysis of signalling protocol sequences is to identify, rapidly and in a targeted manner among the plethora of signalling messages, any procedures not conforming to specifications. In many cases of error in this context, it is insufficient to search for messages with error content or error transmission/reception time, but complex dependencies between protocol messages must be identified.

Signalling protocols in message networks are tested by means of network simulators. Accordingly, in a test case, a given sequence of signalling procedures is stimulated by the network simulator. This is always begun in a well-defined starting condition, reaction of the device under test (DUT=device under test) is registered and tested against the defined, set behaviour according to the set specification. In this context, the entire message exchange between network simulator and device under test is recorded on the various protocol layers in a log file with timestamps. The display and evaluation of this log file takes place after the completion of the test case with the assistance of special applications (Log File Viewer). The user can analyse the protocol sequence for the error search in a sequential manner, filter the content of the log file according to freely selectable criteria and search for given messages.

Accordingly, testing device which is suitable for the implementation of tests and for the subsequent investigation of the log file has been previously disclosed. However, in this context, the log file can still only be investigated in only a single view. It is, in fact, possible to display a list of messages and the content of one selected message simultaneously, a display of two different positions of the list of messages or of different protocol layers is not possible.

SUMMARY OF THE INVENTION

According to one embodiment, a testing device and a method which allow a simple and clearly organised display and analysis of recorded messages is herein provided.

According to another embodiment, a storage unit, a display unit and a control unit is provided herein. The storage unit may store messages of at least one test implemented on at least one device under test. The control unit may read in and display on the display unit at least a part of the messages. The control unit may provide a view-generating device which may be embodied to generate and display by means of the display unit, simultaneously, at least two views, in each case with at least a part of the messages to be displayed. By preference, these views are displayed in a Synchronized manner. Accordingly, the messages can be displayed in a clearly organised and readily accessible manner.

In yet another embodiment, the testing device contains an operating device. The view-generating device is preferably further embodied to display the views controlled by a user by means of the operating device, and preferably to display the positions and sizes of the views controlled by the user. Accordingly, the user can adapt the display to her/his requirements.

In one embodiment, the view-generating device is preferably embodied, in the case of selection of a message in one view, to display the same message in all other displayed views if the respective contents of the views contain the selected message, and to display a message disposed as close as possible with regard to its message number or with regard to its message type or with regard to its message content if the respective contents of the views do not contain the selected message. In this manner, a particularly clearly organised display of the messages is guaranteed.

The view-generating device may be preferably further embodied to synchronize the views on the basis of a message number and/or a message content and/or a message type. In this manner, a clearly organised display of the messages can be achieved independently of the type of test implemented.

In another embodiment, the view-generating device is embodied to display in the views a test sequence and/or a test procedure and/or a source text and/or a pass/fail display and/or message contents and/or a summary of a test sequence. This achieves a further improvement of the clear organisation of the display, because further data can be displayed and compared in addition to the messages.

The control unit preferably may further provide a perspective device which is embodied to store the several views and their respective positions and sizes as a perspective and to load views and their respective positions and sizes stored as perspectives. The view-generating device is then further embodied to display on the display unit views and their respective positions and sizes loaded by the perspective device. In this manner, combinations of views, once prepared, can be stored for subsequent use. Accordingly, the user saves operating time on the renewed preparation of the various views in the case of a renewed, similar test process.

By preference, the storage device may be embodied to store messages of different tests and/or different devices under test. The view-generating device may be then further embodied to display simultaneously in different views the messages of different tests and/or different devices under test. In this manner, the test results of the different tests respectively devices under test can be compared very simply.

The view-generating device is preferably embodied to generate and display by means of the display unit at least three views, by particular preference, at least four views, in each case with a part of the messages to be displayed. This achieves a further improvement of the comparison possibilities.

According to another embodiment, a method and a computer program serves for the processing of messages. The messages of at least one test implemented on at least one device under test may be stored. At least a part of the messages may read in and displayed. At least two views, in each case with at least a part of the messages to be displayed may be generated and displayed. In this context, the views may be displayed in a synchronized manner. Accordingly, the messages can be displayed in a clearly organised and readily accessible manner.

BRIEF DESCRIPTION OF THE DRAWINGS

In the following, the invention is described by way of example with reference to the drawings in which an embodiments of the invention is presented. The drawings show:

FIG. 5 a second presentation of the display unit of the testing device according to one embodiment;

FIG. 6 a third presentation of the display unit of the testing device according to one embodiment.

Initially, the construction and functioning of an embodiment of the testing device according to one embodiment will be explained with reference to FIG. 1. Following this, possible display concepts which are used by the embodiment of the testing device according to one embodiment will be presented with reference to FIGS. 2 and 3. Several presentations of the display unit of the embodiment of the testing device according to one embodiment will then be shown with reference to FIGS. 4-6. Finally, the functioning of an embodiment of the method according to one embodiment will be presented with reference to FIG. 7. The presentation and description of identical elements in similar drawings has not been repeated in some cases.

Figure 1:
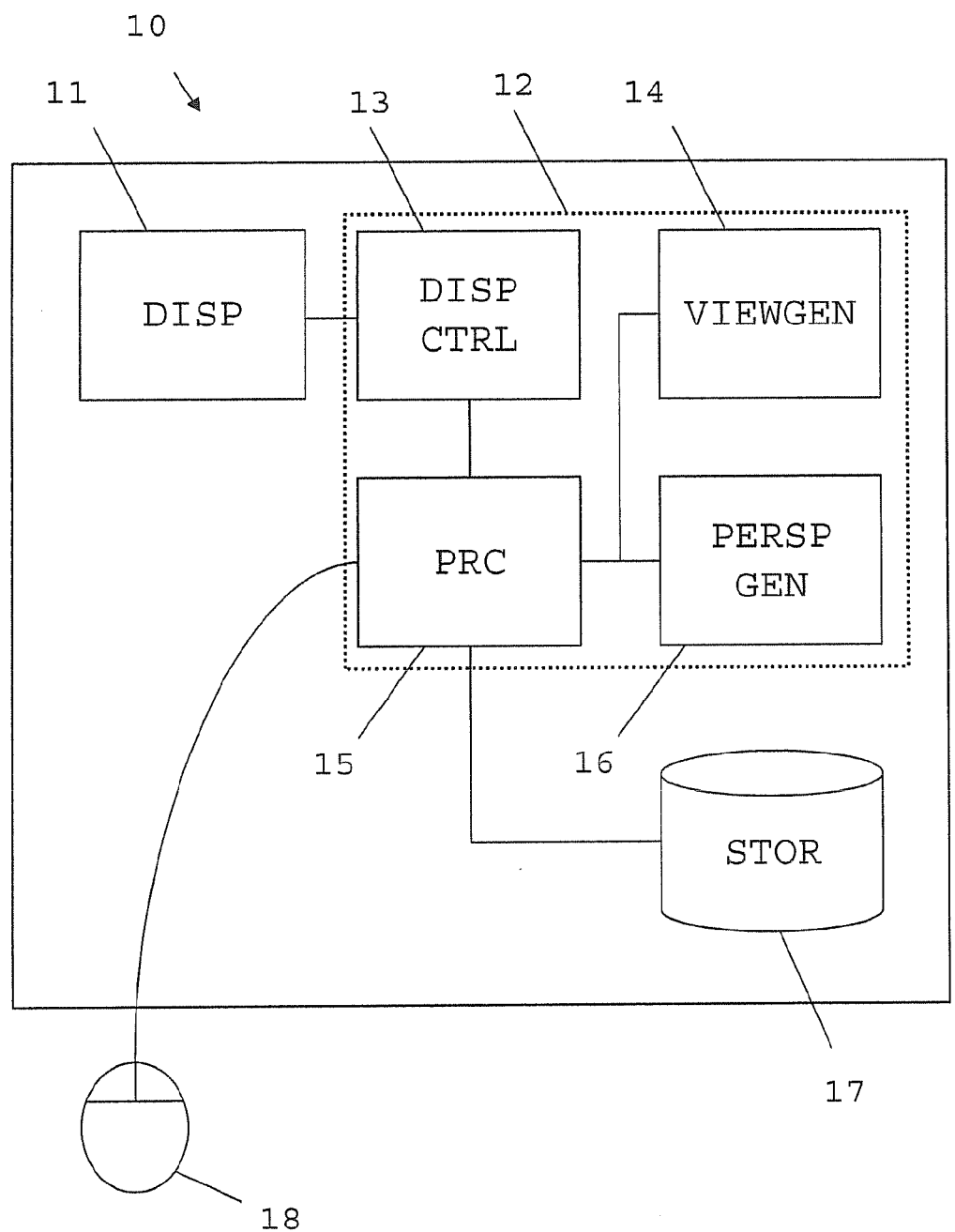
FIG. 1 a testing device according to one embodiment.

FIG. 1 shows a block diagram of an embodiment of the testing device 10 according to one embodiment. It contains a display unit 11, a control unit 12, a storage unit 17 and an operating device 18. In this context, the control unit 12 contains a display-control device 13, a view-generating device 14, a processing device 15 and a perspective device 16.

Accordingly, the display unit 11 is connected to the display-control device 13. The latter is connected to the processing device 15. The processing device 15 is further connected to the view-generating device 14, the perspective device 16 and the storage unit 17. Furthermore, the operating device 18 is also connected to the processing device 15 within the control device 12.

A high-frequency device by means of which tests are carried out on the device under test, according to one embodiment, is not illustrated here. Only the substantial components for the further processing of recorded results are presented here. Regarding the description of the functionality, it is assumed in the following that the storage unit 17 already contains a plurality of recorded messages of a signalling between the testing device 10 and the device under test in the form of a log file.

Accordingly, the control unit 12 may be embodied to read out at least a part of the messages from the storage unit 17 and display them on the display unit 11. In this context, the reading out may be implemented by the processing device 15.

With the assistance of the view-generating device 14, controlled by the user by means of the operating device 18, one or more views are generated and displayed on the display unit 11 with the assistance of the display-control device 13.

In this context, a view may correspond to a selection of given messages respectively other information which are displayed on the display unit at a given position in a given size respectively format. In this context, the user can also generate and display on the display unit 11 by means of the operating device 18 a plurality of views of different content. Accordingly, the selected views draw their content from the log file which is stored in the storage unit 17 and was read in by the processing device 15.

Additionally, signalling sequences and/or source texts underlying the implemented test can be deposited in the log file which may be stored in the storage unit 17. These are then also read in by the processing device 15 and can be displayed by the user in the form of views on the display unit 11.

In this context, the perspective device 16 serves for the storage and loading of perspectives. Here, a perspective may be set of views to be displayed simultaneously. Accordingly, several perspectives pre-defined by the device manufacturer can be stored in the storage unit 17.

The perspective device 16 can load and, in collaboration with the view-generating device 14, display these perspectives from the storage unit 17 on the display unit 11. The perspective device 16 is also embodied to store perspectives prepared by the user. For this purpose, all of the views arranged by the user on the display unit 11 are stored with regard to their content and their position respectively format. Of course, the concretely displayed content is not stored here but only the type of content stored, for example, the displayed protocol layer or the implemented filtering. A filtering here relates to a selection of the messages respectively other information on the basis of given criteria.

If several views are displayed on the display unit 11, the display, in this context, may be implemented in a synchronized manner. That is, mutually corresponding portions of the log file or further data sources, such as the signalling sequence or the source text, are displayed in the views. If a user selects an individual message in a given view, this message is automatically marked in all other views displayed on the display unit 11, provided it can be displayed in the selected view. If the concretely selected message is not itself displayed in individual views, the message displayed directly after in the time sequence is marked. This will be explained in greater detail with reference to FIGS. 2-6. Alternatively, a display of the concretely selected message can also be implemented, which would not display the message according to its filtering. In this case, a colour highlighting of this message in the view can be provided.

Furthermore, it is possible to display views simultaneously on the basis of different log files, that is, different tests and/or different devices under test. Here also, the display can be implemented in a synchronized manner. Of course, a synchronization in this case is not focused on the message number or the timestamp, but on the content of the messages. This will be explained in greater detail, especially with reference to FIGS. 3 and 6. Of course, the synchronization can also be switched off, if independent positions of different views are to be compared.

Figure 2:
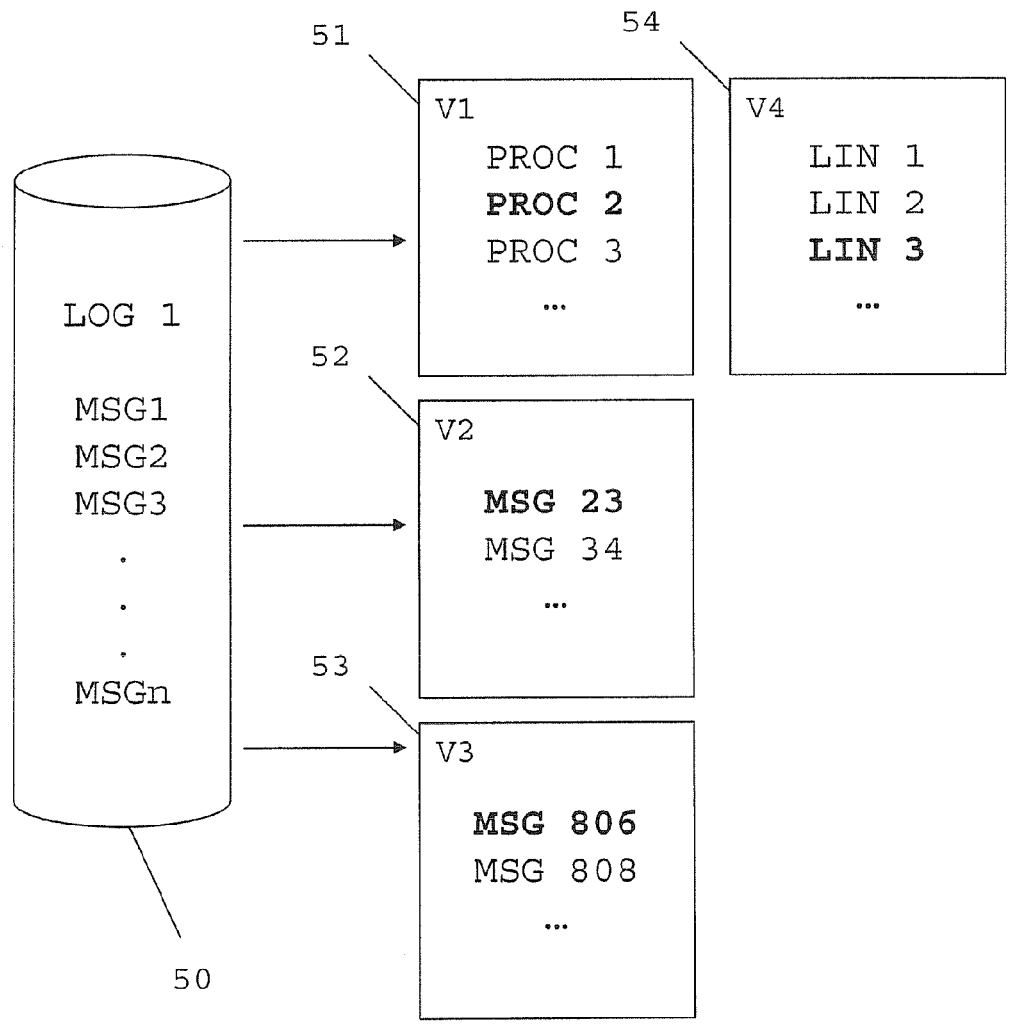
FIG. 2 a first presentation of a display concept which is used by the testing device according to one embodiment.

FIG. 2 presents a first display concept. Messages MSG1, MSG2, MSG3, . . . , MSGn are stored in a log file 50. These messages correspond to a complete signalling sequence between a device under test and the testing device. These messages all originate from one measurement. Additionally, further information can, of course, be stored alongside the messages, as already described.

On the basis of the log file 50, views 51, 52 and 53 are generated. In this context, the views 51-53 correspond to different protocol layers. The view 51 does not contain any messages but rather superordinate procedures, which each correspond to one signalling portion comprising several messages. The view 52 shows messages of a given protocol layer. The view 53 also shows messages of a given protocol layer. Furthermore, a view 54 based on the source text underlying the measurement tasks is displayed. This view contains several lines of the source text.

In this context, mutually corresponding messages, respectively procedures, respectively code lines of the views 51-54 are displayed marked. For example, if the user has selected the message MSG23 in view 52, the procedure PROC2 is automatically selected in view 51, because the message MSG23 was generated within the framework of this procedure. Furthermore, the message MSG806 is automatically selected and marked in view 53, because this is nearest to the message MSG23 in the display there. Furthermore, the code line LIN 3 is automatically selected in view 54, because it comes closest to the generation of the message MSG23.

In the views, a log file can therefore be displayed on different levels of abstraction, for example, one view can serve for the overview, while a further view displays details. Accordingly, for example, a table of contents of a log file could be displayed in one view. This allows a quick overview of the significant signalling steps.

In this context, the individual views 51-54 can be predetermined by the manufacturer of the testing device. Alternatively, the user can adapt the views according to her/his requirements or even prepare the entire perspective—the combination of the views in their position, format and in their content—from new.

Figure 3:
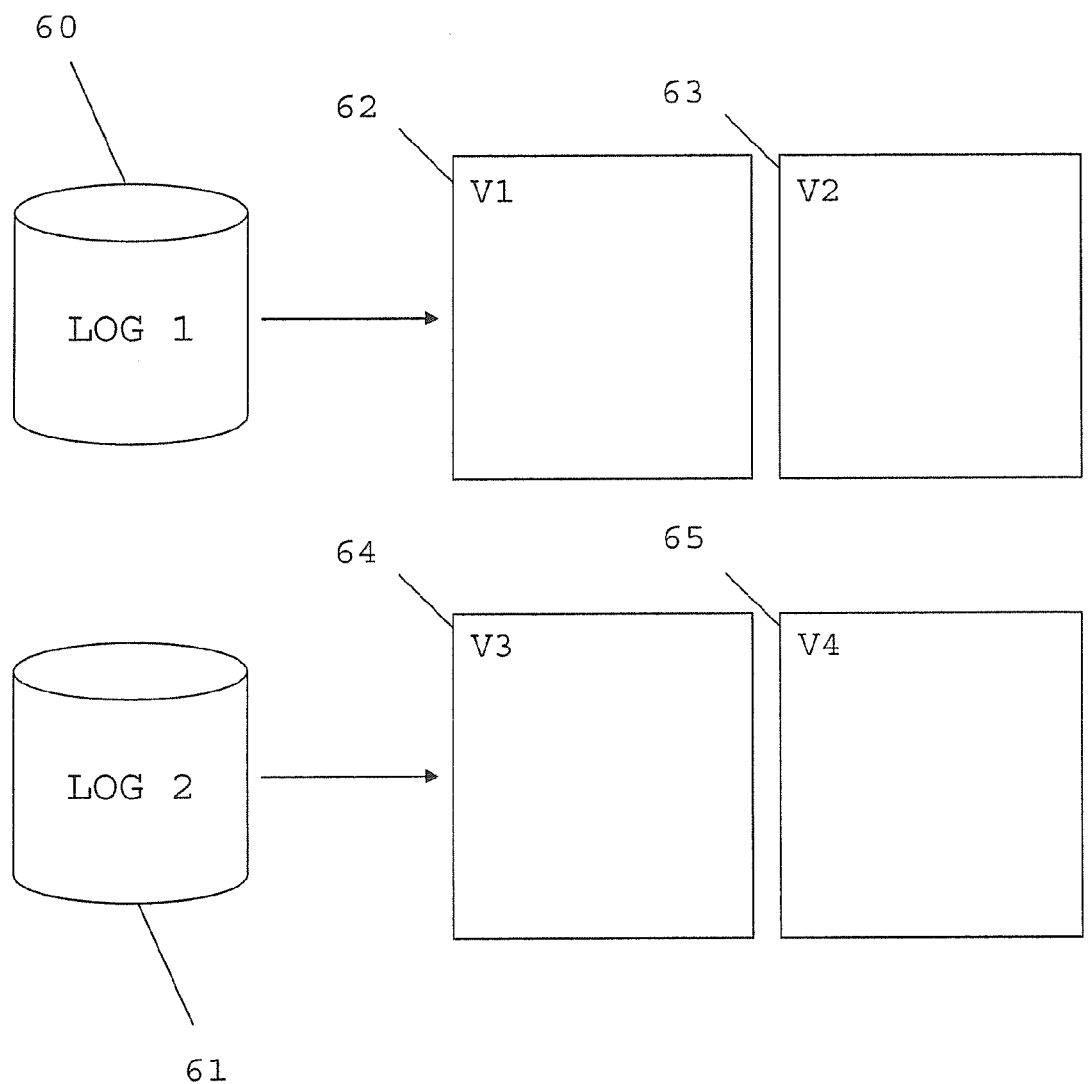
FIG. 3 a second presentation of a display concept which is used by a testing device according to one embodiment.

FIG. 3 shows a second display concept. Here, views 62-65 are prepared on the basis of two different log files 60, 61. In this context, the log files 60, 61 originate from different tests, optionally with different devices under test. The views 62 and 63 in this context originate from the log file 60. The views 64, 65 originate from the log file 61. The exact content of the views 62-65 will not be described in greater detail here. It should merely be pointed out here that, in a perspective, which, in this case, contains the views 62-65, views which have been generated from different log files can also be displayed.

However, within each individual log file 60, 61, the synchronization is initially implemented according to the message number respectively the timestamp. That is, in view 62, a given view is selected, thus, it is initially attempted also to display the given message in the view 63.

After a corresponding message from the log file 61 has been determined, this message is displayed in all views 64, 65 which are generated from the second log file 61. That is, the views 64 and 65 show the same message if possible.

Of course, a display of contents which do not correspond to messages is also conceivable here. In this case, elements which come as close as possible to the corresponding message are also selected and displayed here in the respective views.

Here also, the display is implemented in a synchronized manner. However, a synchronization to the message number or the timestamp is not particularly helpful here. Accordingly, this synchronization is implemented on the basis of the message content respectively the message type. For example, if a message which serves for the establishment of a connection is selected in the view 62, all other views 63-65 are searched with regard to a possibly corresponding message, and this is displayed in the respective view 63-65.

In addition to the synchronization with the corresponding message, a synchronization with regard to the display can also be implemented. For example, filter settings which set the degree of abstraction respectively the depth of information can be matched. For instance, if messages of one protocol layer "Layer 3" are displayed in a first view, a display filtered on the protocol layer "Layer 3" is also implemented after a synchronization in a second view of another log file.

Figure 4:
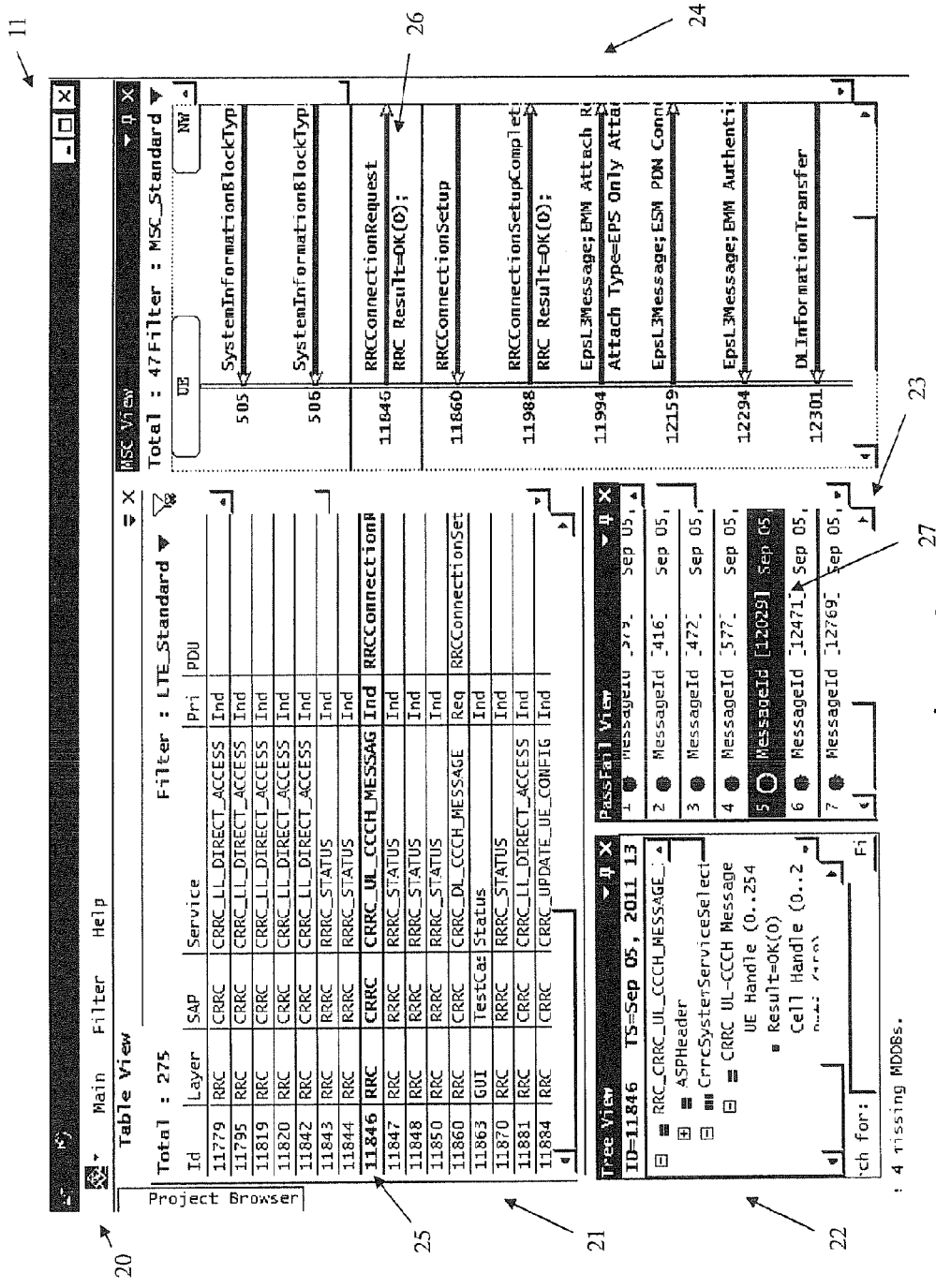
FIG. 4 a first presentation of the display unit of the testing device according to one embodiment.

In FIG. 4, an exemplary content of the display unit 11 of the embodiment of the testing device according to one embodiment is shown. The display unit 11 here shows a menu bar 20, a first view 21, a second view 22, a third view 23 and a fourth view 24. By means of the menu bar 20, it is possible for the user to implement settings in the testing device. The views 21-24 provide different sizes and positions and contents. These are each adjustable by the user by means of the operating device 18.

The view 21 shows a message table. In this context, the first column shows the message number under the standard designation "Id". Accordingly, each message is numbered, in ascending order and unambiguously, corresponding to its timestamp. The marked message 25 here provides the message number 11846.

The second column lists the protocol layer to which the message belongs. This is designated as standard with the term "Layer". In the column "SAP", further status information regarding the message is displayed. The column "Service" in this context shows sub-groupings of the message within a protocol layer. The column "PRI" shows the message type of the message. A message can thus have four different types. The abbreviation "REQ" indicates a request. The abbreviation "CNF" is a confirmation message. The abbreviation "IND" indicates status information. The abbreviation "RSP" is used only within the testing device and is not relevant to the protocol. Finally, for individual messages, references are made to their content in the column "PDU".

In the view 21, a filtering of the messages has been implemented. This is recognisable in the upper region of the view 21. Accordingly, only messages which correspond to the LTE standard may be displayed here. This means that the list of messages provide gaps in the message numbers. The intervening messages not illustrated here do not correspond to the filtering selected here.

The view 22 shows a tree-view of the entire content of the current message. The current message is selected in the first view 21 and is accordingly displayed in bold.

In this context, the view 23 shows a pass/fail display. Accordingly, individual steps of the test sequence which are numbered in the first column are provided with a traffic-light display. If a desired result has occurred, the traffic-light display is coloured green. By contrast, if an undesired result has occurred, the traffic-light display is coloured red. The message 25 selected in the first view 21 is therefore not itself displayed, because it is not associated with its own traffic-light display. However, in order to realise the synchronization as well as possible, the marking in the third view 23 jumps to the message disposed as near as possible after the message number for the message 25. This is the message with the message number 12029. The user can therefore readily recognise in this context whether the corresponding step in the test sequence at which the message 25 belongs in the first view 21, has run successfully.

Finally, the fourth view 24 shows a message-sequence diagram. In this context, the device under test is indicated in the left column, while the communications network is indicated in the right column. The messages passing to and fro between these two participants are displayed in their time sequence from top to bottom. Here also, the message 26 with the message number 11846 is displayed highlighted. This message corresponds to the message 25 from the first view. Here also, a filtering of the displayed messages is implemented. Accordingly, the sequence of message numbers is also not continuous here. The arrows on the individual messages indicate the direction of flow of the message.

Figure 5:
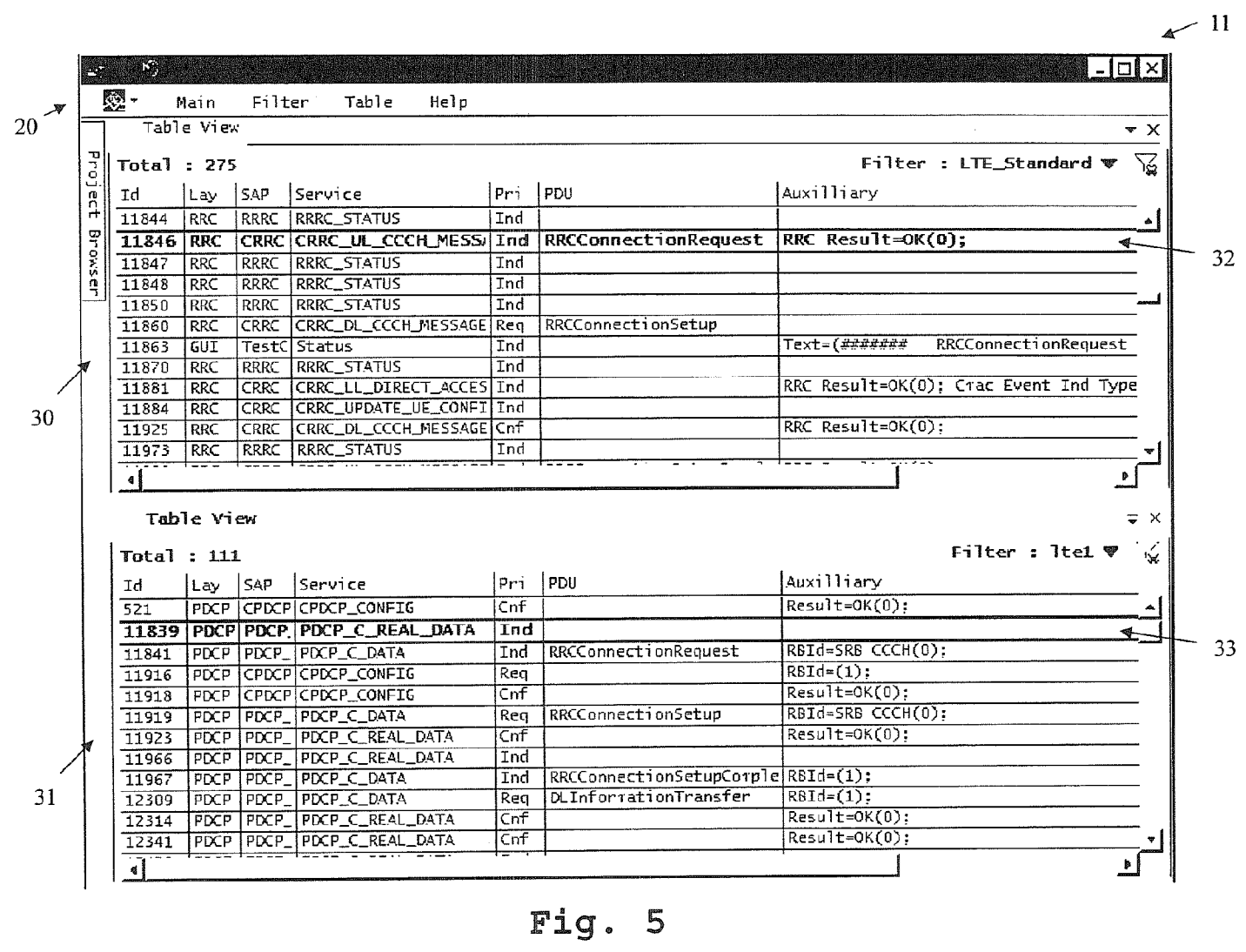

FIG. 5 shows a further presentation of the display unit 11 in the case of the embodiment of the testing device according to one embodiment. Here also, the display unit shows a menu bar 20. Furthermore, a first display 30 and a second display 31 are shown. Both displays 30, 31 in this context show an identical log file, that is, show the sequence of the same test. However, both views 30, 31 are provided with different filters. Accordingly, the first view 30 shows only messages which correspond to the LTE standard. The second view 31, by contrast, shows a different selection of messages. Now, if a message 32 which provides the message number 11846 is selected in the first view, the second view 31 jumps to the same message. However, since this message is not displayed by the second view, the second view 31 jumps to the message which is as near as possible to the requested message. In this case, this relates to the highlighted message 33 with the message number 11839.

Figure 6:
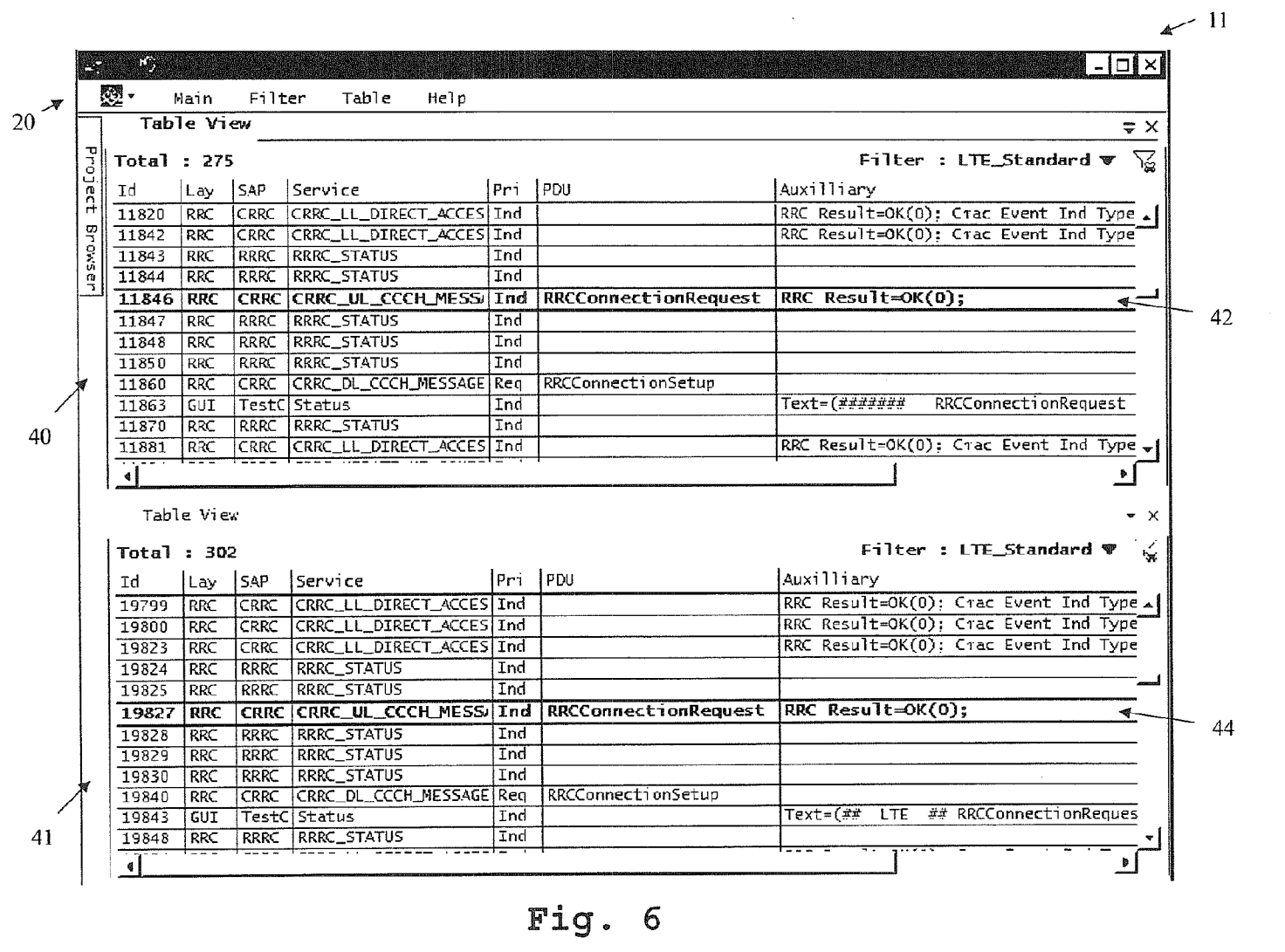

FIG. 6 shows a third presentation of the display unit 11 of the embodiment of the testing device according to one embodiment. Here also, the display shows a menu bar 20. Furthermore, a first view 40 and a second view 41 are displayed one above the other. In this context, the view 40 shows an excerpt from a message list of a first log file. By contrast, the view 41 shows an excerpt from a second log file. That is, the two views 40, 41 show excerpts from independent tests. In this context, these tests can be implemented on the same device under test or on different devices under test. The message numbers in the two views 40, 41 are therefore not connected to one another. That is, a synchronization of the views 40, 41 on the basis of the message numbers is not expedient. Accordingly, the synchronization 4 is based on the content respectively type of the selected message. If, in a first view 40, the message 42, which provides the message number 11846 is selected, the message type respectively the content of the message is initially determined. In the case of the message 42, the entry in the column "Auxiliary" is most informative. Accordingly, a message with the corresponding entry is now searched for in the view 41. This message 44, here, with the message number 19827, provides the identical entry and is therefore regarded as the corresponding message and highlighted.

Figure 7:
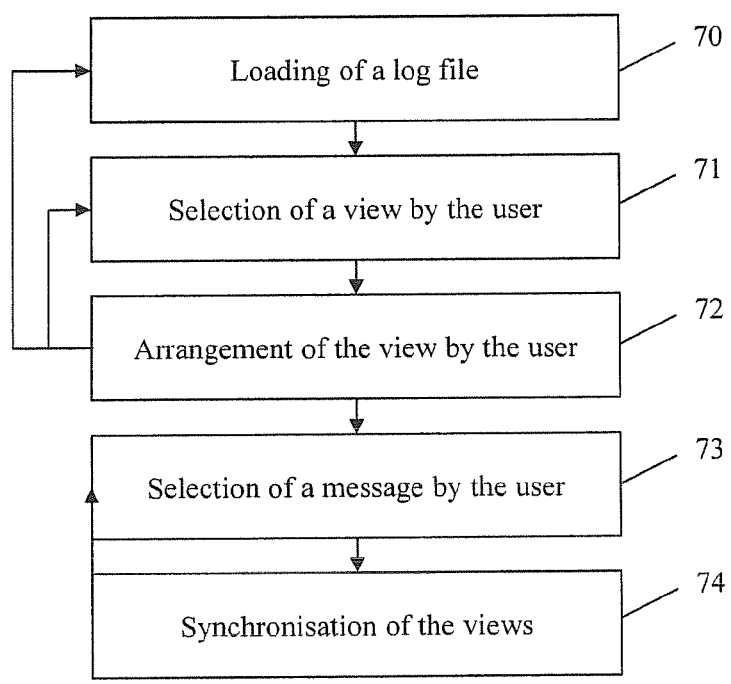
FIG. 7 an embodiment of the method according to one embodiment.

Finally, FIG. 7 shows an embodiment of the method according to one embodiment. In a first step 70, a log file is loaded. In this context, all, or only a part of the messages contained in the log file are read in. In a second step 71, a user selects a view to be displayed. This can be, for example, a message-sequence diagram, as illustrated in FIG. 4. In a third step 72, the user arranges the view on the display unit by means of an operating device. In this context, she/he also specifies the position and the size of the view. If the user wishes further views of this log file, she/he continues in step 71.

When the user has arranged all desired views of this log file on the display unit, she/he can continue with the first step 70 and load a further log file. An alternating return to the steps 70 and 71 is also possible. As soon as the user has arranged all views of all log files to be observed on the display unit, she/he continues with a fourth step 73. In this step, the user selects a message in one of the views displayed. Following this, in a fifth step 74, all of the displayed views are automatically synchronized with the view in which the user has selected the message. That is, if exactly the selected message can be displayed with the respective filter settings of the views, the view jumps to exactly this message and displays it. However, if exactly this message cannot be displayed in front of the respective view, since it is masked because of the filter settings, the respective view jumps to a message disposed as near as possible, advantageously to a subsequent message disposed as near as possible. If the selected message cannot be displayed because it does not originate from the same log file, the respective view jumps to a message disposed as near as possible on the basis of the message type or the message content. The procedure is similar if the view does not display any messages, but displays a source text or other information as an alternative. In this case also, there is an automatic jump to information disposed as near as possible.

After the synchronization, the user can of course continue with loading a new log file or other information source in the first step 70. Alternatively, she/he can also continue in the second step 71 or in the third step 72 or in the fourth step 73. If she/he continues in the third step 73, she/he can again move an already placed view on the display unit and change its size.

The invention is not restricted to the embodiments presented. Of course, all different protocols in communications systems can be investigated. A restriction to the LTE protocol is not provided. Also, the log files can, of course, also be loaded from a central memory in a communications network. That is, the storage unit is then connected to the remainder of the testing device by means of the communications network. Within the scope of the invention, all of the features described above or shown in the drawings can be advantageously combined with one another arbitrarily.

The invention claimed is:

1. A testing device comprising: a storage unit, a display, a control unit, and an operating device,
   wherein the storage unit is embodied to store messages of at least one test performed on at least one device under test,
   wherein the control unit is embodied to read in and display on the display at least a part of the messages, wherein the control unit provides a view generating device, which is embodied to generate simultaneously and to display by means of the display at least two views, with at least a part of the messages to be displayed, and
   wherein the view-generating device is further embodied to display the views by a user by means of the operating device, or to display the positions and sizes of the views controlled by the user; or wherein the view-generating device is further embodied to display the same message in all further displayed views if the respective contents of the views contain the selected message, and to display a message disposed as close as possible with regard to its message number, with regard to its message type, or with regard to its message content if the respective contents of the views do not contain the selected message.

2. The testing device according to claim 1,
   wherein the view-generating device is embodied to display the views in a synchronized manner.

3. The testing device according to claim 1,
wherein the view-generating device is further embodied to synchronize the views on the basis of a message number or a message content or a message type.

4. The testing device according to claim 1,
wherein the view-generating device is further embodied to display in the views a test sequence, a test procedure, a source text, a pass/fail display, message contents, or a summary of a test sequence.

5. The testing device according to claim 1,
wherein the control unit further provides a perspective-device which is embodied to store the several views and their respective positions and sizes as perspective, and to load views stored as perspectives, their respective positions, or sizes, and
wherein the view-generating device is further embodied to display views loaded by the perspective device, their respective positions, or sizes on the display.

6. The testing device according to claim 1,
wherein the storage unit is embodied to store messages of different tests, or different devices under test, and
wherein the view-generating device is further embodied to display messages of different tests, or different devices under test simultaneously in different views.

7. The testing device according to claim 1,
wherein the view-generating device is embodied to generate and display by means of the display three or four views, with at least a part of the messages to be displayed.

8. A method for the automatic processing of messages,
wherein the messages of at least one test performed on at least one device under test are stored in a storage unit,
wherein at least a part of the messages is read in and displayed,
wherein at least two views with at least a part of the messages to be displayed are generated and displayed simultaneously,
wherein the views are displayed and controlled by a user,
wherein the positions and sizes of the views are displayed and controlled by the user,
wherein in the case of selection of a message in one view, the same message is displayed in all further displayed views if the respective contents of the views contain the selected message, and
wherein a message disposed as close as possible with regard to its message number or with regard to its message type or with regard to its message content, is displayed if the respective contents of the views do not contain the selected message.

9. The method according to claim 8, wherein the views are displayed in a synchronized manner.

10. The method according to claim 8, wherein the views are synchronized on the basis of a message number or a message content or a message type.

11. The method according to claim 8, wherein in the views, a test sequence, a test procedure, a source text, a pass/fail display, message contents, or a summary of a test sequence are displayed.

12. The method according to claim 8,
wherein the several views and their respective positions, or sizes are stored as perspective, or that views and their respective positions or sizes stored as perspectives are loaded, and
wherein loaded views and their respective positions and/or sizes are displayed on a display unit.

13. The method according to claim 8,
wherein the messages of different tests, or different devices under test are stored, or
wherein the messages of different tests, or different devices under test are displayed simultaneously in different views.

14. The method according to claim 8,
wherein three or four views, with at least a part of the messages to be displayed are generated and displayed.

15. A computer program with program-code means for the implementation of all steps according to claim 8 when the program is executed on a computer or a digital signal processor.

16. A computer program product with program-code means stored on a machine-readable data medium for the implementation of all of the steps according to claim 8 when the program is executed on a computer or a digital signal processor.

* * * * *